(12) United States Patent
Berghegger et al.

(10) Patent No.: US 11,415,434 B1
(45) Date of Patent: Aug. 16, 2022

(54) WIRELESS ENERGY AND DATA TRANSFER IN A GAS METER

(71) Applicant: Honeywell International Inc., Morris Plains, NJ (US)

(72) Inventors: Ralf Heinrich Schröder genannt Berghegger, Glandorf (DE); Andreas Wuchrer, Osnabrück (DE); Patrick Flacke, Osnabrueck (DE)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 17/155,795

(22) Filed: Jan. 22, 2021

(51) Int. Cl.
| | |
|---|---|
| *G01D 4/00* | (2006.01) |
| *H02J 50/10* | (2016.01) |
| *G06Q 50/06* | (2012.01) |
| *H01F 3/14* | (2006.01) |
| *G01F 15/063* | (2022.01) |

(52) U.S. Cl.
CPC ........... *G01D 4/004* (2013.01); *G01F 15/063* (2013.01); *G06Q 50/06* (2013.01); *H01F 3/14* (2013.01); *H02J 50/10* (2016.02); *H02J 2310/12* (2020.01)

(58) Field of Classification Search
CPC ...... G01D 4/004; H02J 50/10; H02J 2310/12; G01F 15/063; G06Q 50/06; H01F 3/14
See application file for complete search history.

(56) References Cited

U.S. PATENT DOCUMENTS

| | | | |
|---|---|---|---|
| 4,896,105 A * | 1/1990 | Engel | G01R 21/133 318/696 |
| 8,334,787 B2 | 12/2012 | Bushman et al. | |
| 8,656,789 B2 | 2/2014 | Davis et al. | |
| 9,356,659 B2 | 5/2016 | Partovi | |
| 2010/0280632 A1* | 11/2010 | Beaumarchais | G05D 7/0635 700/47 |
| 2014/0260661 A1* | 9/2014 | Smith | G01F 1/584 73/861.12 |
| 2017/0108905 A1 | 4/2017 | Cichonski | |
| 2018/0139598 A1* | 5/2018 | Martin | G01D 4/02 |
| 2019/0033105 A1* | 1/2019 | Hosseinifar | G01F 1/60 |
| 2019/0094329 A1* | 3/2019 | Minich | G01R 35/04 |

OTHER PUBLICATIONS

Daniel Measurement and Control White Paper, Application of the Orifice Meter for Accurate Gas Flow Measurement, 2010 Daniel Measurement and Control, Inc.

(Continued)

*Primary Examiner* — Amine Benlagsir
(74) *Attorney, Agent, or Firm* — Ortiz & Lopez, PLLC; Kermit D. Lopez; Luis M. Ortiz

(57) ABSTRACT

An apparatus for energy and data transfer, can include a first inductor and a second inductor, wherein the first inductor can be magnetically coupled to the second inductor, and a gap configured between the first inductor and second inductor, wherein the first inductor and the second inductor can transfer energy and data between a white meter and an electronic index. The white meter may be implemented as a flow meter. The electronic index can include an electronic display unit that can be attached to the white meter. The electronic display can include one or more of a display unit, a communications unit, or a combination of a display unit and the communications unit.

20 Claims, 3 Drawing Sheets

(56) References Cited

OTHER PUBLICATIONS

"Eddy Current," Wikipedia, Retrieved from "https://en.wikipedia.org/w/index.php?title=Eddy_current&oldid=996299254", page last edited on Dec. 25, 2020, at 19:01 (UTC).

"Economy 7", Wikipedia, Retrieved from "https://en.wikipedia.org/w/index.php?title=Economy_7&oldid=982966680", page last edited on Oct. 11, 2020, at 13:09 (UTC).

Likun Wang, "Assessment of the Stray Flux, Losses, and Temperature Rise in the End Region of a High-Power Turbogenerator Based on a Novel Frequency-Domain Model", IEEE Transactions on Industrial Electronics, vol. 65, No. 6, Jun. 2018.

\* cited by examiner

WIRELESS ENERGY AND DATA TRANSFER IN A GAS METER

TECHNICAL FIELD

Embodiments relate to sealed devices. Embodiments also relate to sensors, including flow meters. Embodiments further relate to gas meters and white meters.

BACKGROUND

A white meter is the part of a gas meter through which the gas flows. The white meter must be hermetically sealed to prevent a gas leak. The white meter contains the means for measuring the gas flow.

Conventionally, data and energy can be transferred between an index and a white meter via cable. This cable requires a feedthrough that is gas tight and heat resistant. Alternatively, a magnetic feedthrough may be used. This method has some disadvantages including the fact that the mechanical construction is quite complicated, which can increase material and labor cost. In addition, it is difficult to disconnect and reconnect the index to the white meter. This makes it difficult to exchange the index. Furthermore, if no internal controller is used then each function may require several wires, which make the feedthrough complicated, and sometimes more than one feedthrough may be used (either several cable feedthroughs or one magnetic feedthrough and additional cable feedthroughs).

In order to overcome these problems, a solution is needed, which can enable easy exchange of the index, and in which no cable may be disconnected and reconnected. The mechanical construction should also be simplified. Furthermore, less material may be needed for the feedthrough.

BRIEF SUMMARY

The following summary is provided to facilitate an understanding of some of the features of the disclosed embodiments and is not intended to be a full description. A full appreciation of the various aspects of the embodiments disclosed herein can be gained by taking the specification, claims, drawings, and abstract as a whole.

It is, therefore, one aspect of the disclosed embodiments to provide for an improved metering device.

It is another aspect of the disclosed embodiments to provide for an improved flow meter (e.g., a gas meter).

It is a further aspect of the disclosed embodiments to provide for an improved apparatus for energy and data transfer.

The aforementioned aspects and other objectives can now be achieved as described herein. In an embodiment, an apparatus for energy and data transfer, can include a first inductor and a second inductor, wherein the first inductor is magnetically coupled to the second inductor, and a gap configured between the first inductor and second inductor, wherein the first inductor and the second inductor transfer energy and data between a white meter and an electronic index.

In an embodiment of the apparatus, the white meter can comprise a flow meter.

In an embodiment of the apparatus, the electronic index can comprise an electronic display unit attached to the white meter, and the electronic display can comprise one or more of: a display unit, a communications unit, or a combination of a display unit and the communications unit.

In an embodiment of the apparatus, the white meter can comprise a flow meter and the electronic index can comprise an electronic display unit attached to the white meter.

In an embodiment of the apparatus, the gap can include an opening having an optimized shape covered by a non-conducting material.

In an embodiment of the apparatus, the optimized shape can comprise a shape that can provide optimal support to the non-conducting material to assist the non-conducting material in withstanding a gas pressure and a temperature.

In an embodiment of the apparatus, the gap can include an opening having an optimized shape covered by a non-conducting material, and the optimized shape can possess a shape that can provide optimal support to the non-conducting material to assist the non-conducting material in withstanding a gas pressure and a temperature.

In an embodiment of the apparatus, the gap can be filled with an electrically non-conductive material.

In an embodiment of the apparatus, the gap can be filled with a ferrite material.

In another embodiment, a sensor for measuring, detecting and transmitting data, can include a first inductor and a second inductor, wherein the first inductor is magnetically coupled to the second inductor, and a gap configured between the first inductor and second inductor, wherein the first inductor and the second inductor transfer energy and data between a white meter and an electronic index, wherein the white meter comprises a flow meter and the electronic index comprises an electronic display unit attached to the white meter.

In an embodiment of the sensor, the gap can include an opening having an optimized shape covered by a non-conducting material, and the optimized shape can comprise a shape that can provide optimal support to the non-conducting material to assist the non-conducting material in withstanding a gas pressure and a temperature.

In an embodiment of the sensor, the gap can be filled with an electrically non-conductive material.

In an embodiment of the sensor, the gap can be filled with a ferrite material.

In an embodiment of the sensor, the data can comprise one or more of: temperature data, pressure data, flow data, and motion data.

In another embodiment, a method for energy and data transfer, can involve magnetically coupling a first inductor and a second inductor, and transferring energy and data between a white meter and an electronic index across a gap configured between the first inductor and second inductor, wherein the first inductor and the second inductor transfer the energy and the data between the white meter and the electronic index.

In an embodiment of the method, the can gap can include an opening having an optimized shape covered by a non-conducting material, and the optimized shape can have a shape that can provide optimal support to the non-conducting material to assist the non-conducting material in withstanding a gas pressure and a temperature.

In an embodiment of the method, the gap can be filled with an electrically non-conductive material.

In an embodiment of the method, the gap can be filled with a ferrite material.

In an embodiment of the method, the white meter can comprise a flow meter and the electronic index can comprise an electronic display unit that may be attached to the white meter.

In an embodiment of the method, the data can comprise one or more of: temperature data, pressure data, flow data, and motion data.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other issues, subject matter may be embodied as methods, devices, components, or systems. Accordingly, embodiments may, for example, take the form of hardware, software, firmware, or a combination thereof. The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein may not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Generally, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Figure 1:
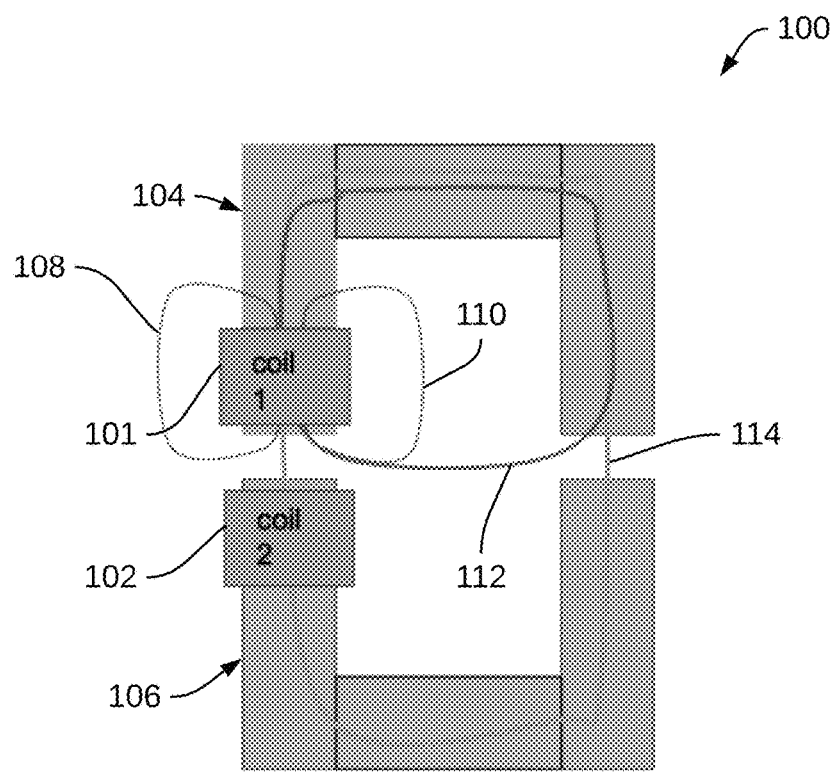
FIG. 1 illustrates a block diagram of two inductors an U-core forming a magnetic coupling, in accordance with an embodiment.

FIG. 1 illustrates a block diagram of a magnetic coupling 100, in accordance with an embodiment. The magnetic coupling 100 shown in FIG. 1 can include a first inductor 101 (e.g., a coil) and a second inductor 102 (e.g., a coil). The first inductor 101 can be situated with respect to a U-shaped member 104 (also referred to as a "U-core") and the second inductor 102 can be located with respect to a U-shaped member 106 (also referred to as a "U-core"). An effective flux 114 is shown as extending across the U-shaped member 104 and the U-shaped member 106. A stray flux that includes flux portions 108, 110, 112 is also shown in FIG. 1.

Figure 2:
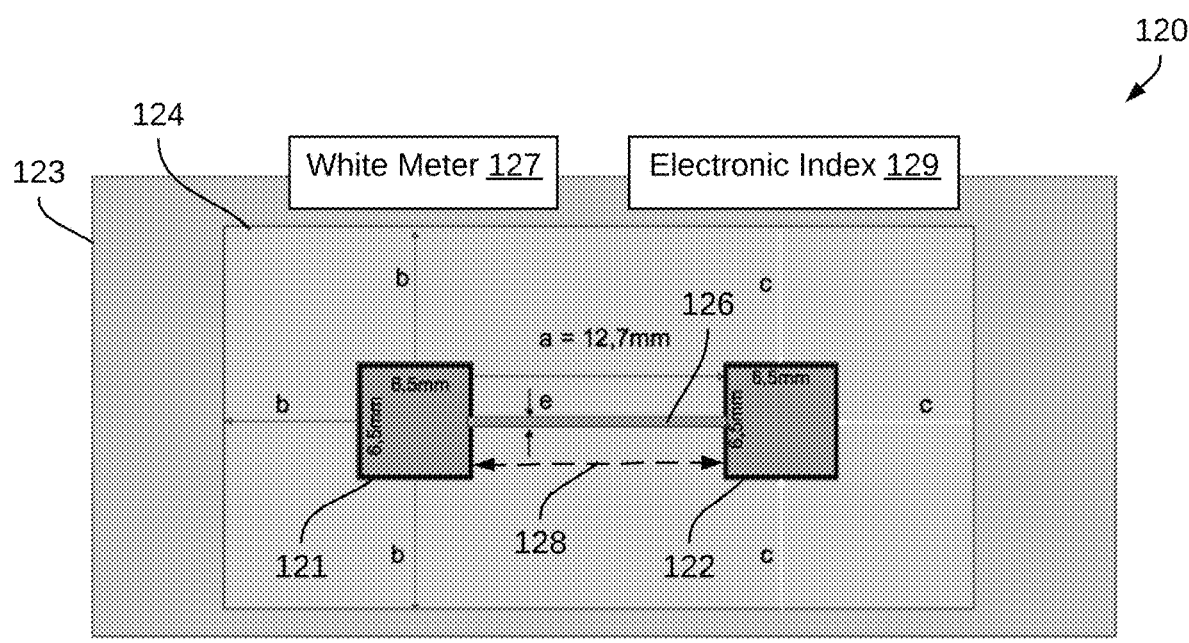
FIG. 2 illustrates a block diagram of a part of a housing of a white meter that can be positioned between the two inductors, in accordance with an embodiment.

FIG. 2 illustrates a block diagram of an apparatus 120 including the section of the wall of a housing of a white meter that can be located between a U-shaped core of the first inductor 104 and the U-shaped core of the second inductor 106. The electronics of the white meter 127 can be located behind this section, with an electronic index 129 in front of it. The apparatus 120 can be utilized for energy and data transfer.

In an assembled gas meter, the ends of the U-cores 104 and the U-core 106 shown in FIG. 1 can fit onto the square areas 121 and 122 with the U-core 104 from the front and the U-core 106 from the back. The area 123 shown in FIG. 2 can be configured as a standard housing material, which may be magnetically and electrically conducting (e.g. iron). The area 124 can be configured as an insertion that can be magnetically not conducting, but may be electrically conducting (e.g., brass). The areas 121, 122 and 126 are preferably magnetically and electrically non-conducting.

Note that in FIG. 2, example parameters are depicted including, for example, measurements fitting to an available U-core 124. For example, a=12.7 mm, e=0.5 mm and b=c=6.35 mm. It should be appreciated that such measurements and parameters are for illustrative and exemplary purposes only and are not considered limiting features of the embodiments. The electrically non-conducting materials or areas 121 and 122 can be provided in a hole of the magnetically non-conducting material 124 or it can be a layer on top of or below the magnetically non-conducting material 124.

Note that the U-cores are the shaded areas 104 and 106 depicted in FIG. 1. The inductors can be formed from the U-cores and the coils. Both are shown in FIG. 1, but not in FIG. 2. To clarify, what is depicted in FIG. 2 is the configuration between the U-cores in FIG. 1. This configuration is not shown in FIG. 1, because it would be horizontal between the U-cores. So, one may see just the edge.

Furthermore, the gap is the distance between the first inductor 104 and the second inductor 106 in FIG. 1 on both sides of the U-cores. The area 126 can be a slit in the electrically conducting material that is needed to prevent current in the area 124 around each leg of the U-cores this has the width e.

The material (e.g., brass, aluminum) 124 may be magnetic non-conducting material, as large as possible. A minimum size may be related to the length of the magnetic field lines: b+c≥a. The material 121 and 122 may be electrical and magnetically non-conducting, and may have a same size as the cross section of the U-cores 104 and 106 or larger. Examples of a material, which can form the areas 121, 122 and 126, can include plastic, ceramic, or glass. Note that the material 123 may be electrical and magnetically conducting (e.g., material 123 may form part of a meter housing).

The apparatus 100 can use coupled inductors (e.g., the first inductor 101 and the second inductor 102) to transfer energy and data. The energy and data transfer can cross a barrier that is gas tight and high-temperature resistant. A non-conducting material can cover an opening with an optimized shape. The shape of the opening is essential, because it must provide optimum support to the non-conducting material to assist it in withstanding a gas pressure under high temperature. The apparatus 120 shown in FIG. 2 can use two or three materials, as thin as possible, with an optimized geometry.

Figure 3:
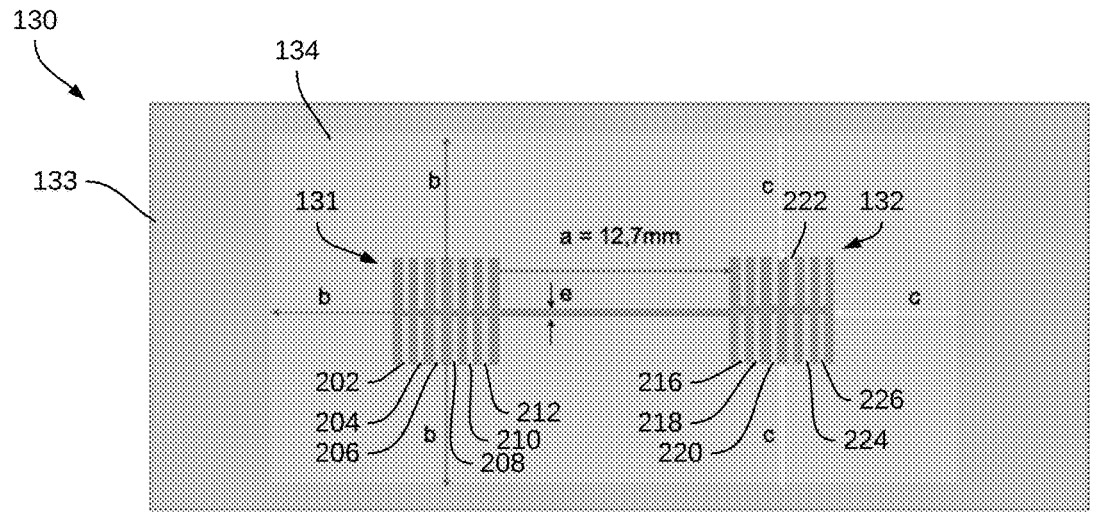
FIG. 3 illustrates a block diagram of the part of a housing of a white meter that can be positioned between the two inductors, in accordance with another embodiment.

FIG. 3 illustrates a block diagram of an apparatus 130 alternative to that of the apparatus 120 of FIG. 2. In the apparatus 130 shown in FIG. 3, the electrically non-conducting sections can be supported by a plurality of small fingers 202, 204, 206, 208, 210, 212, 214 and 216, 218, 220, 222, 224, 226, 228 of electrically conducting material to increase stability especially at high temperature conditions. The width of these fingers must be sufficiently small to minimize eddy current. The fingers 202, 204, 206, 208, 210, 212, and the fingers 216, 218, 220, 222, 224, 226 must not cross the whole width of the electrically non-conducting material. The gap between the opposing fingers prevents big eddy currents. Note that the portion 133 shown in FIG. 3 may be configured form ferrite (i.e., one leg of the U-core). The apparatus 130 can be utilized for energy and data transfer.

The area of the electrical and magnetically non-conducting material of the first separator 131 and the second separator 132 may be the same size as the cross section of the U-cores 104 and 106 or larger. A direct connection may be made by a small gap in material, and filled with this material (e.g. plastic, ceramic, glass). The material (e.g., brass, aluminum) forming the area 124 may be magnetic non-conducting material, as large as possible. A minimum size may be related to the length of the magnetic field lines: b+c≥a. As discussed previously, the measurements and parameters depicted in the figures and discussed herein are for illustrative and exemplary purposes only and are not considered limiting features of the embodiments.

Figure 4:
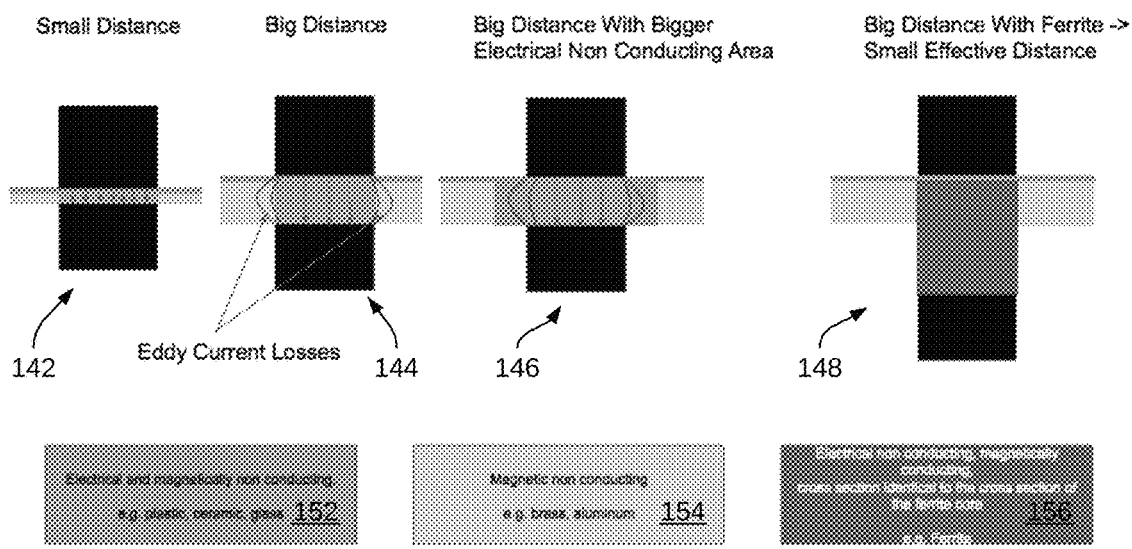
FIG. 4 illustrates a block diagram depicting the effect of material thickness with respect to the magnetic field, in accordance with an embodiment.

FIG. 4 illustrates a block diagram depicting different configurations for energy and data transfer, and the effect of material thickness with respect to the magnetic field, in accordance with varying embodiments. FIG. 4 depicts an apparatus 142 for energy and data transfer based on a small distance, and an apparatus 144 for energy and data transfer based on a big distance (note that apparatus 144 can be considered a 'bad' example). Magnetic field lines that can cause eddy current losses are also shown in FIG. 4 with respect to the apparatus 144. An apparatus 146 for energy and data transfer is also depicted in FIG. 4 based on a big distance with a bigger electrical non-conducting area. Furthermore, an apparatus 148 for energy and data transfer is shown in FIG. 4. The apparatus 148 has a configuration based on a big distance with ferrite→small effective distance. Note that corresponding material features for each apparatus 142, apparatus 144, apparatus 146, and apparatus 148 are shown in block 152, block 154, and block 156. Note that each of the apparatus 142, apparatus 144, apparatus 146, and 148 depict one leg of first inductor 104 and one leg of the second inductor 106

Figure 5:
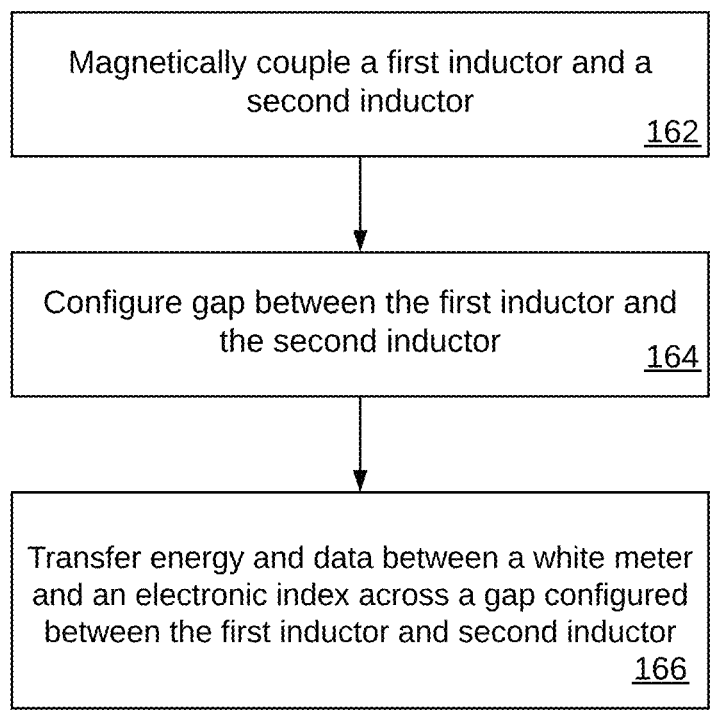
FIG. 5 illustrates a flow chart of operations depicting logical operational steps of a method for energy and data transfer, in accordance with an embodiment.

FIG. 5 illustrates a flow chart of operations depicting logical operational steps of a method 160 for energy and data transfer, in accordance with an embodiment. As shown at block 162, a step or instruction can be implemented to magnetically couple a first inductor (e.g., first inductor 121, first inductor 131) and a second inductor (e.g., second inductor 122, second inductor 132). Next, as shown at block 164, a step or operation can be implemented configure a gap between the first inductor and the second inductor. Then, as shown at block 166, a step or operation can be implemented to transfer energy and data between a white meter and an electronic index across the gap configured between the first inductor and second inductor, wherein the first inductor and the second inductor transfer the energy and the data between the white meter and the electronic index.

As discussed previously, the gap can be configured to include an opening having an optimized shape covered by a non-conducting material, and wherein the optimized shape comprises a shape that can provide optimal support to the non-conducting material to assist the non-conducting material in withstanding a gas pressure and a temperature. The gap may be filled with, for example, an electrically non-conductive material or a ferrite material.

Although the operations of the apparatus(s) and method(s) herein are shown and described in a particular order, the order of the operations of each method the disclosed devices may be altered so that certain operations may be performed in an inverse order or so that certain operations may be performed, at least in part, concurrently with other operations. In another embodiment, steps, instructions or operations or sub-operations of distinct operations may be implemented in an intermittent and/or alternating manner.

It should also be noted that at least some of the steps or operations of the devices, apparatuses and methods described herein may be implemented using software instructions stored on a computer useable storage medium for execution by a computer including, for example, a microcontroller as discussed herein. As an example, an embodiment of a computer program product can include a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), a digital video disk (DVD), Flash memory, and so on.

Alternatively, embodiments may be implemented entirely in hardware or in an implementation containing both hardware and software elements. In embodiments that do utilize software, the software may include but is not limited to firmware, resident software, microcode, etc. Example implementations of the embodiments can include a hardware device with some embedded software for measuring/detecting and transmitting data (e.g. temperature, pressure, motion). Other example implementations of the embodiments may include embedded software that runs in a device/unit (e.g., firmware).

In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, it can be appreciated that a number of embodiments including preferred and alternative embodiments, are disclosed herein. For example, in a preferred embodiment, an apparatus for energy and data transfer, can include a first inductor and a second inductor, wherein the first inductor is magnetically coupled to the second inductor, and a gap configured between the first inductor and second inductor, wherein the first inductor and the second inductor transfer energy and data between a white meter and an electronic index.

In an embodiment of the apparatus, the white meter can comprise a flow meter.

In an embodiment of the apparatus, the electronic index can comprise an electronic display unit attached to the white meter, and the electronic display can comprise one or more of: a display unit, a communications unit, or a combination of a display unit and the communications unit.

In an embodiment of the apparatus, the white meter can comprise a flow meter and the electronic index can comprise an electronic display unit attached to the white meter.

In an embodiment of the apparatus, the gap can include an opening having an optimized shape covered by a non-conducting material.

In an embodiment of the apparatus, the optimized shape can comprise a shape that can provide optimal support to the non-conducting material to assist the non-conducting material in withstanding a gas pressure and a temperature.

In an embodiment of the apparatus, the gap can include an opening having an optimized shape covered by a non-conducting material, and the optimized shape can possess a shape that can provide optimal support to the non-conducting material to assist the non-conducting material in withstanding a gas pressure and a temperature.

In an embodiment of the apparatus, the gap can be filled with an electrically non-conductive material.

In an embodiment of the apparatus, the gap can be filled with a ferrite material.

In another embodiment, a sensor for measuring, detecting and transmitting data, can include a first inductor and a second inductor, wherein the first inductor is magnetically coupled to the second inductor, and a gap configured between the first inductor and second inductor, wherein the first inductor and the second inductor transfer energy and data between a white meter and an electronic index, wherein the white meter comprises a flow meter and the electronic index comprises an electronic display unit attached to the white meter.

In an embodiment of the sensor, the gap can include an opening having an optimized shape covered by a non-conducting material, and the optimized shape can comprise a shape that can provide optimal support to the non-conducting material to assist the non-conducting material in withstanding a gas pressure and a temperature.

In an embodiment of the sensor, the gap can be filled with an electrically non-conductive material.

In an embodiment of the sensor, the gap can be filled with a ferrite material.

In an embodiment of the sensor, the data can comprise one or more of: temperature data, pressure data, flow data, and motion data.

In another embodiment, a method for energy and data transfer, can involve magnetically coupling a first inductor and a second inductor, and transferring energy and data between a white meter and an electronic index across a gap configured between the first inductor and second inductor, wherein the first inductor and the second inductor transfer the energy and the data between the white meter and the electronic index.

In an embodiment of the method, the can gap can include an opening having an optimized shape covered by a non-conducting material, and the optimized shape can have a shape that can provide optimal support to the non-conducting material to assist the non-conducting material in withstanding a gas pressure and a temperature.

In an embodiment of the method, the gap can be filled with an electrically non-conductive material.

In an embodiment of the method, the gap can be filled with a ferrite material.

In an embodiment of the method, the white meter can comprise a flow meter and the electronic index can comprise an electronic display unit that may be attached to the white meter.

In an embodiment of the method, the data can comprise one or more of: temperature data, pressure data, flow data, and motion data.

It will be appreciated that variations of the above-disclosed embodiments and examples and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. An apparatus for transfer of energy and data, the apparatus comprising:
   a first inductor and a second inductor, wherein the first inductor is magnetically coupled to the second inductor; and
   a gap configured between the first inductor and the second inductor, wherein the first inductor and the second inductor transfer the energy and the data between a white meter and an electronic index, wherein the gap comprises an opening having an optimized shape covered by a non-conducting material, and wherein the optimized shape comprises a shape that provides optimal support to the non-conducting material to assist the non-conducting material in withstanding a gas pressure and a temperature.

2. The apparatus of claim 1 wherein the white meter comprises a flow meter.

3. The apparatus of claim 1 wherein:
   the electronic index comprises an electronic display unit attached to the white meter; and
   the electronic display unit comprising at least one of: a display unit, a communications unit, or a combination of the display unit and the communications unit.

4. The apparatus of claim 1 wherein the white meter comprises a flow meter and the electronic index comprises an electronic display unit attached to the white meter.

5. The apparatus of claim 1 wherein the non-conducting material comprises electrically non-conducting sections supported by fingers of electrically conducting material that increase stability.

6. The apparatus of claim 5 wherein the fingers possess a width sufficiently small to minimize an eddy current.

7. The apparatus of claim 1 wherein the first inductor and the second inductor are formed from at least one U-core and at least one coil.

8. The apparatus of claim 1 wherein the gap is filled with an electrically non-conductive material.

9. The apparatus of claim 1 wherein the gap is filled with a ferrite material.

10. A sensor for measuring, detecting and transmitting data, the sensor comprising:
    a first inductor and a second inductor, wherein the first inductor is magnetically coupled to the second inductor; and
    a gap configured between the first inductor and the second inductor, wherein the first inductor and the second inductor transfer energy and the data between a white meter and an electronic index, wherein the white meter comprises a flow meter and the electronic index comprises an electronic display unit attached to the white meter, wherein the gap comprises an opening having an optimized shape covered by a non-conducting material, and wherein the optimized shape comprises a shape that provides optimal support to the non-conducting material to assist the non-conducting material in withstanding a gas pressure and a temperature.

11. The sensor of claim 10 wherein the non-conducting material comprises electrically non-conducting sections supported by fingers of electrically conducting material that increase stability.

12. The sensor of claim 10 wherein the gap is filled with an electrically non-conductive material.

13. The sensor of claim 10 wherein the gap is filled with a ferrite material.

14. The sensor of claim 10 wherein the data comprises at least one of: temperature data, pressure data, flow data, and motion data.

15. A method for a transfer of energy and data, the method comprising:
    magnetically coupling a first inductor and a second inductor; and
    transferring the energy and the data between a white meter and an electronic index across a gap configured between the first inductor and the second inductor,
    wherein the first inductor and the second inductor transfer the energy and the data between the white meter and the electronic index,
    wherein the gap comprises an opening having an optimized shape covered by a non-conducting material, and wherein the optimized shape comprises a shape that provides optimal support to the non-conducting material to assist the non-conducting material in withstanding a gas pressure and a temperature.

16. The method of claim 15 wherein the non-conducting material comprises electrically non-conducting sections supported by fingers of electrically conducting material that increase stability.

17. The method of claim 15 wherein the gap is filled with an electrically non-conductive material.

18. The method of claim 15 wherein the gap is filled with a ferrite material.

19. The method of claim 15 wherein the white meter comprises a flow meter and the electronic index comprises an electronic display unit attached to the white meter.

20. The method of claim 15 wherein the data comprises at least one of: temperature data, pressure data, flow data, and motion data.

\* \* \* \* \*